Sept. 12, 1967 C. F. HADLEY 3,341,853
HIGH SPEED PLOTTER
Filed Dec. 27, 1965 3 Sheets-Sheet 2

CHARLES F. HADLEY
INVENTOR.

BY John D. Gassett

ATTORNEY.

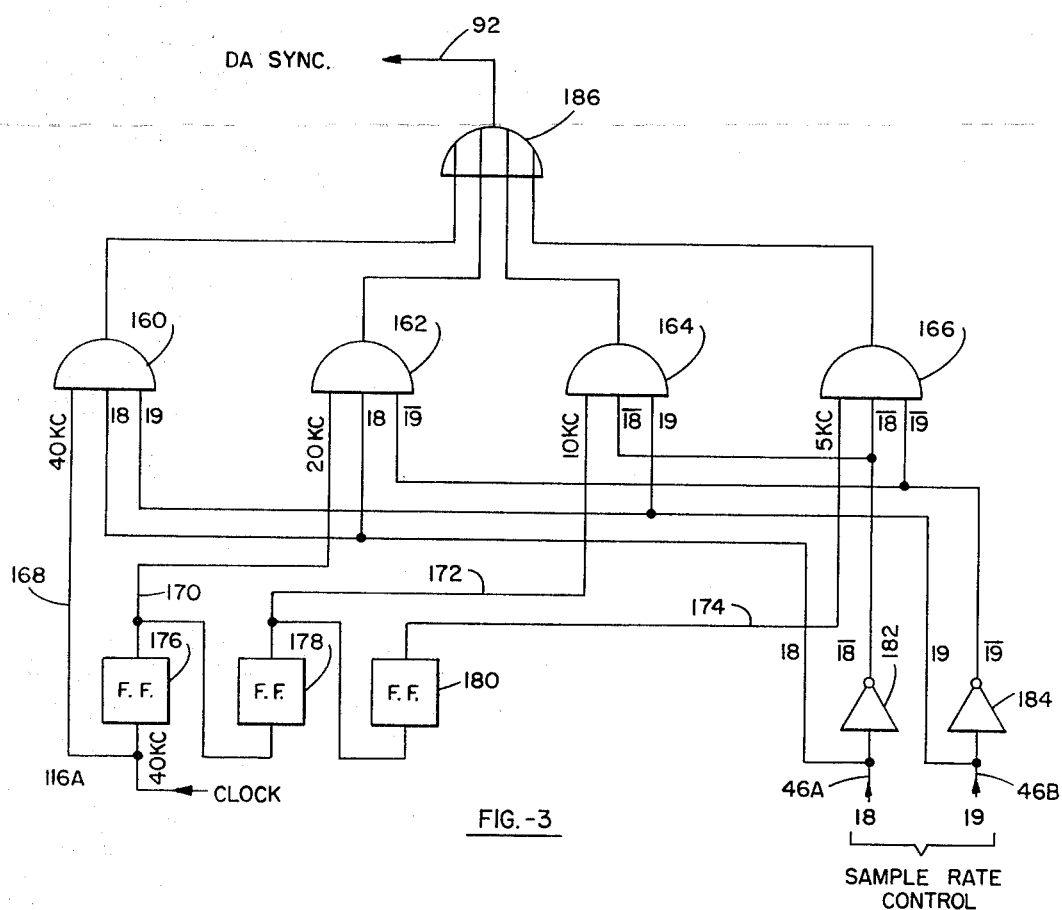
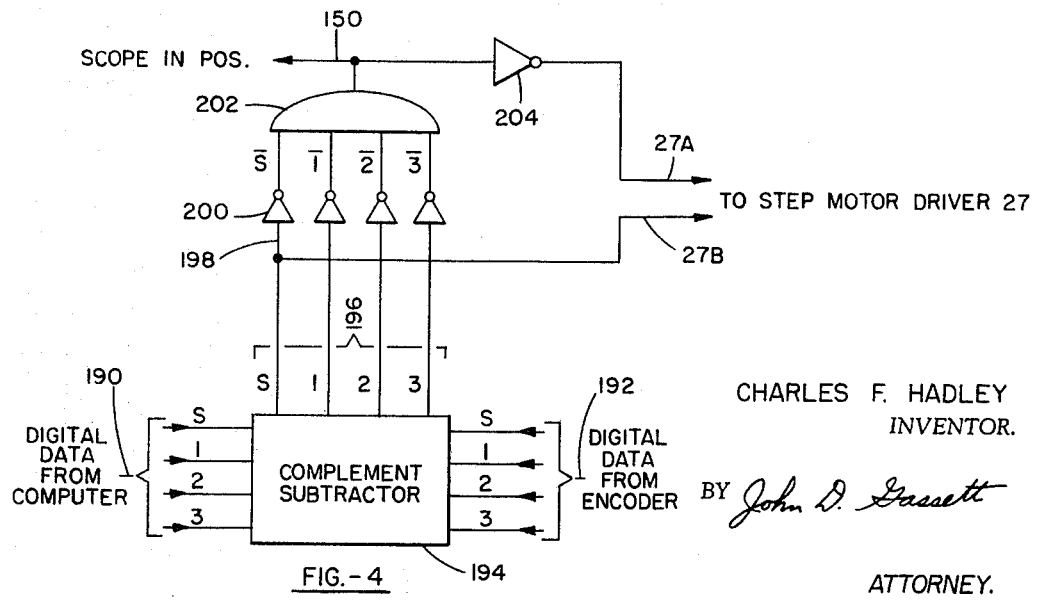

United States Patent Office 3,341,853
Patented Sept. 12, 1967

3,341,853
HIGH SPEED PLOTTER
Charles F. Hadley, Tulsa, Okla., assignor to Pan American Petroleum Corporation, Tulsa, Okla., a corporation of Delaware
Filed Dec. 27, 1965, Ser. No. 516,575
10 Claims. (Cl. 346—33)

ABSTRACT OF THE DISCLOSURE

A high speed plotter for displaying seismic signals from a digital computer. Seismic data stored in the computer are converted to analog form and these voltages are used to develop and position a trace electronically on the face of a cathode ray tube for exposing a recording medium. The computer has a cathode ray tube position output channel to control the position of the cathode ray tube with respect to the recording medium. The actual position of the cathode ray tube is compared to the position commanded by the computer. If the two do not agree, the tube is moved until agreement is reached. Means are also provided to modulate the electron beam of the tube according to a signal received from the seismic signal channel of the computer. Means are also provided to coordinate the movement of the recording medium and the output seismic data from the computer.

---

This invention concerns the display of seismic signals. It relates especially to a system for the display of information contained in a plurality of seismic signals having amplitude variations with respect to time.

Geophysical prospecting using artificially induced seismic disturbances has found wide application in the search for petroleum and other minerals. It is a general practice to initiate a seismic disturbance at a point near the surface of the earth to direct seismic waves downward into the earth from that point. The waves continue to travel downward until they encounter discontinuities in the earth's structure in the form of various substrata and the like. A portion of the seismic waves are reflected back toward the surface of the earth from such discontinuities. By arranging a plurality of geophones at spaced distances from the seismic disturbance point, it is possible to detect the arrival of the reflected seismic waves at the surface of the earth. These detected waves are normally translated into electric impulses which are indicative of the character of the ground motion and are usually referred to collectively as a seismic signal. A seismic signal is in effect a composite signal made up of a plurality of electrical signals varying in frequency and amplitude.

The seismic signals resulting from a plurality of seismic disturbances are detected at a plurality of locations. The composite seismic signals or its display from each geophone location is commonly referred to as a seismic trace. Such seismic traces or signals are arranged in a side by side relationship to form what is commonly called a seismic section. The seismic section is in effect a cross-sectional picture or display of a cross-section through the earth being surveyed. The cross-section may represent many miles along a line across the earth. Before a seismic section can take on true meaning many and various well known corrections such as spread, time, velocity, etc., have to be applied to the various traces which make up the section.

Many new processes and techniques are being developed for processing seismic signals which go into a seismic section to enhance its value and accuracy. Many of these processes include the use of high speed digital computers for performing such processing and also for applying the various corrections. Although the computers can perform many operations upon the seismic signals such as sophisticated filtering, such data is in reality of little value until or unless it can be displayed in visual form. Then skilled operators can analyze the visual form to determine subsurface structure.

These high speed computers can process seismic signals at an exceptionally high speed rate. However, no matter how fast or how accurate the processing is, it is of little value until it is displayed in a visual form which is substantially as accurate as the processing. It is therefore an object of this invention to provide a high speed visual display system for use with a high speed digital computer. Briefly, in a preferred embodiment, my invention concerns a system for displaying a seismic section from seismic signals which have been processed in a high speed computer. It includes a drum driven at a high constant rate of speed and upon which a photosensitive film has been placed. A cathode ray tube is positioned adjacent the drum in a manner so that its electron beam can be focused upon the periphery of the drum. Means, in conjunction with a high speed digital computer, are provided to shift the electron beam laterally a select distance at each revolution of the drum or at the end of the printing of each trace. The shifting is laterally along the surface of the drum in a line parallel to the axis thereof. After the electron beam has been shifted a preselected number of times the entire cathode ray tube is shifted a selected distance laterally along a line parallel to the axis of the drum. The computer controls the shifting of the cathode ray tube. At this time the electron beam is shifted to its original position and then sequentially shifted again periodically, e.g., at the end of each revolution of the drum. The shifting of the electron beam and of the cathode ray tube is continued until the entire seismic section or group of sections has been printed.

In further accordance with my invention clocking means are provided so that incremental fractions of rotation of the film drum is synchronized with the output of the seismic signal from the computer. Thus any errors in the final seismic section due to variations of speed of rotation of the drum during any one revolution is minimized. Means are further provided to ensure that the scope and its electron beam are in the proper location for each seismic signal that is printed. Means are also further provided so that no signal will be projected on to the periphery of the drum until the drive motor is running at maximum speed, a trace is available from the computer for printing, and the cathode ray tube is in the proper position. Means are additionally provided so that the seismic signal is initiated at the proper time in relation to other signals on the drum.

Various objects and a better understanding of the invention can be had from the following description taken in conjunction with the drawings in which:

FIGURE 3 is a block diagram of a sample rate control means as illustrated in FIGURE 1;

FIGURE 4 is a block diagram of a suitable digital comparator of FIGURE 1; and,

Although modern computers are exceptionally fast in processing data, the processing is of no benefit until the results have been displayed. This is especially true in the processing of seismic data. In many computer operations the results can be displayed by merely providing the answer obtained through the use of an electric typewriter connected to the computer. However, when using a computer with seismic data it is not so easy to display the results. In displaying the seismic data the traces must be arranged precisely in a side by side relationship to have meaning. The time relation of the adjacent traces in the display must also very closely coincide for the traces to be meaningful. This invention discloses a novel recording means which cooperates with a modern digital computer to assure that the data representing seismic traces are correctly displayed. In this regard, I shall first discuss the recording means and then later the means by which the recording means cooperate with the computer to obtain the required precision in recording.

Figure 1:
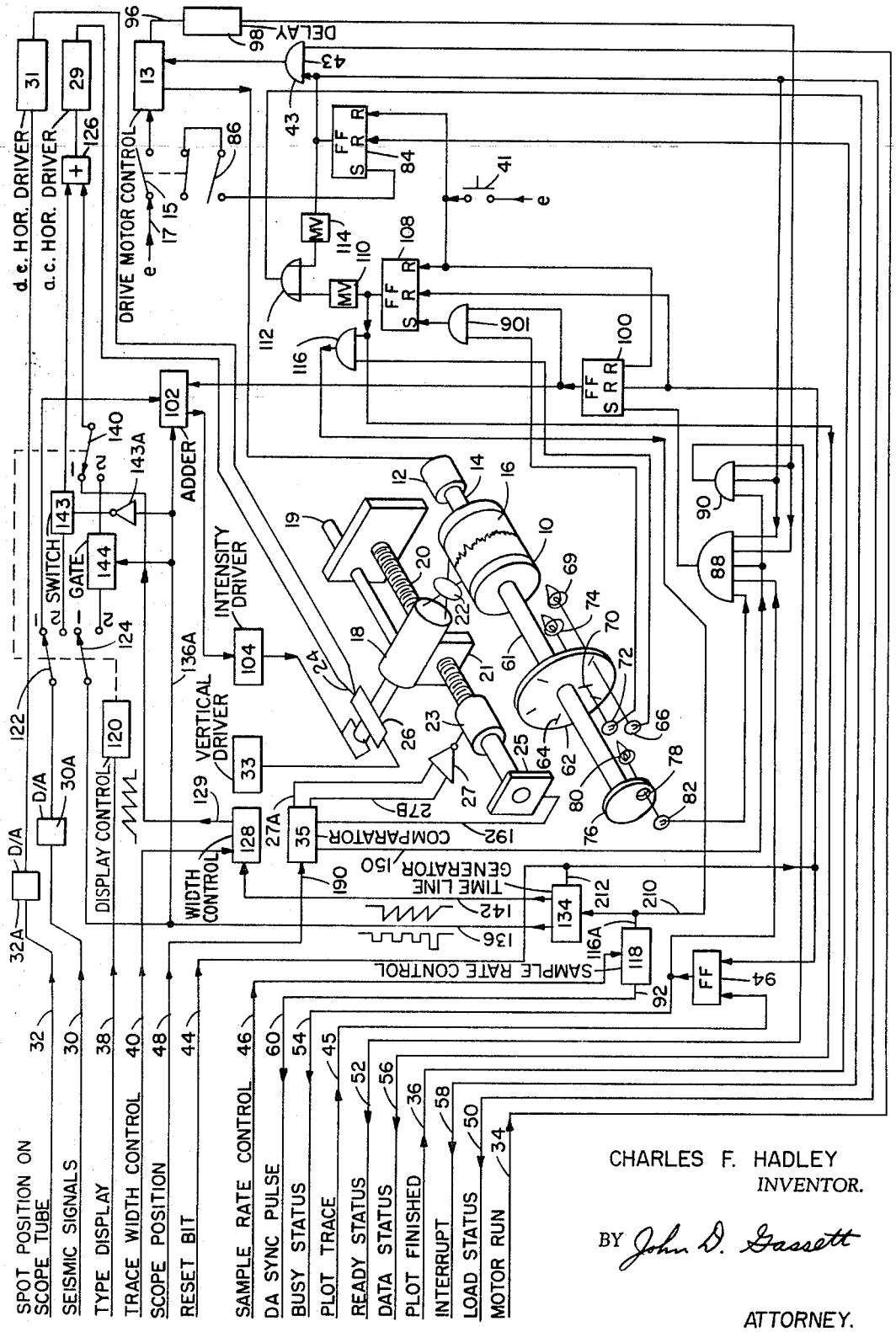
FIGURE 1 illustrates a preferred embodiment of this invention using a display system.

Attention is first directed to FIGURE 1 which shows a drum 10 mounted upon axle 14 which is driven by drive motor 12. A photographic film 16 is mounted upon the periphery of drum 10. A drive motor control 13 controls the starting and stopping of motor 12. A hand-operated motor drive switch 15 connects the drive motor control 13 to a suitable power source $e$. Drive motor control 13 is in reality a switch or gate for example which in order to transmit electrical energy from switch 15 to motor 12 must also receive a voltage on line 17. As will be explained hereinafter before line 17 can have a voltage thereon the computer and the rest of the recording system must be "ready."

I will now discuss the cathode ray tube and associated assembly for exposing film 16 with the side by side traces of a seismic section. A horizontal shaft 20 is supported parallel to shaft 14 of drum 10. Cathode ray tube 18 is mounted on guide brackets 19 adjacent shaft 20. A lower frame 21 is attached to cathode ray tube 18 and has internal threads which match the threads of shaft 20 so that as shaft 20 is rotated, cathode ray tube 18 is moved laterally therealong. The cathode ray tube 18 is arranged together with lens 22 to direct light from the electron beam of its face to film 16. Cathode ray tube 18 has vertical deflection yoke 26 and double winding horizontal deflection yoke 24. One of the windings of yoke 24 is connected to a D.C. horizontal driver 31 and the other connected to an A.C. horizontal driver 29. These two drivers are controlled by the computer and the means for such control will be discussed hereinafter. The D.C. horizontal driver 31 controls the lateral "at rest" (when no seismic signal is being recorded) or zero signal position of the electron beam on the scope. The A.C. horizontal driver 31 causes lateral movement of the beam to follow the seismic signal. The vertical deflection yoke 26 is connected to a vertical driver 33 which can be adjusted to place the light from the electron beam of cathode ray tube 18 in the proper position on film 16. In this embodiment this adjustment is done by hand.

Step motor 23 is provided to drive shaft 20 to which cathode ray tube 18 is threadedly coupled through base 21. Encoder 25 is connected to the shaft from step motor 23 and has an output voltage signal indicative of the angular position of step motor 23. The output of encoder 25 is fed to digital comparator 35. As will be seen, digital comparator 35 is controlled by an output signal from the computer. The digital comparator 35 compares the actual position of step motor 23 which the required position received from the computer. If these two are different, the comparator has an output which corrects the position of the step motor so that it agrees with the required position as commanded by the computer. The output of the digital comparator is connected through lines 27A and 27B to the step motor driver 27 to accomplish this correction.

The rotation of drum 10 must be closely synchronized with the information received from the computer. To accomplish this, a time sign information disk 62 and initiate cam 76 are provided on shaft 61 which is connected to rotate with shaft 14 of drum 10. Time sign information disk 62 has a plurality of slots 64 equally spaced in a circle. There may be any number of such slots; in one embodiment in which the drum 10 rotates at 133 revolutions per minute, it was found that 14,400 slots were particularly suitable.

A light 69 is provided on one side of disk 62. On the other side is a first photoelectric cell 66. As the disk rotates light from light source 69 sequentially passes through slits 64 to photocell 66. Each time a slit permits light to pass through, a "clock" pulse is emitted by photoelectric cell 66. Thus, during each rotation of the drum 10 there is a plurality of synchronizing pulses which are used to maintain the rotational position of drum 10 in close synchronization with the data seismic signals being provided by the computer. A pulse slot 70, which is at a different radius on time sign information disk 62, is provided between a light source 74 and photocell 72. Once each revolution of drum 10, photocell 72 provides a "start of data pulse." This is used to tell the computer that the recording mechanism is ready to receive another seismic trace and that the computer should prepare to send data.

Initiate cam 76 has one hole 78 thereon which is between light source 80 and photoelectric cell 82. When hole 78 is aligned therebetween photocell 82 emits a pulse which as will be seen is used as one of the requirements in starting the recording operation.

I will now discuss how the previously described recording equipment is coordinated with a computer.

Modern computers have output channels which can contain a very wide variety of information. This information is available at what is commonly referred to as "output channels." These computers can also receive information or commands from sources exterior of the computer itself. Such outside commands are applied at what is generally termed "input channels." As is known, these outside commands can cause the computer to deliver data, retain data, or store it.

One output channel of the computer can contain a variety of information. For example, a word occupying one position can refer to one parameter and the next word in the sequence can refer to still another parameter. The computer can separate these sequences of words and provide them at proper output terminals or leads. These channels can contain as many lead lines as necessary to convey or receive commands or information. In the embodiment shown in FIGURE 1 there is illustrated output channels 32, 30, 38, 40, 48, 44, 46, 45, 36 and 34. The types of information which will appear on these terminals are indicated in the following table.

*Table I*

| Information: | Output channel |
|---|---|
| Seismic signal | 30 |
| Spot position on scope tube | 32 |
| Motor run | 34 |
| Plot finished | 36 |
| Type display | 38 |
| Trace width control | 40 |
| Reset word | 44 |
| Plot trace | 45 |
| Sample rate control | 46 |
| Scope position | 48 |

A digital computer can also contain any number of input channels for receiving information which may tell it when to transmit data and the like. Shown in FIGURE 1 are six such channels and they are listed in Table II.

*Table II*

| Information word: | Input channel |
|---|---|
| Load status | 50 |
| Ready status | 52 |
| Busy status | 54 |
| Data status | 56 |
| Interrupt | 58 |
| Digital to analog converter synchronization pulse | 60 |

As said above, before the computer transmits a seismic signal to be recorded on film 16 of drum 10, drum 10 must be rotating at the proper speed so that for the time required for one revolution of the drum (or a selected portion thereof) will coincide with the length of time for the computer to transmit a seismic signal from channel 30. This is accomplished by having the speed of motor 12 such that it will attain one revolution (or a selected portion thereof) in the amount of time required to transmit a seismic signal from the computer. However, before recording, one must wait for the motor to attain full speed. Thus, one of the factors required before data will be transmitted is that the motor must be running at the proper speed. However before the motor will start, there must be a "motor run" signal received from channel 34 of the computer and the operator must actuate "load" button 86. In other words both the computer and the operator must be ready before the motor can start. Drive motor control 13, which can be a relay switch, does not pass electrical power until it receives a signal (which for example closes the relay switch) from "and" gate 43. "And" gate 43 must be enabled before it can have an output. An "and" gate must have an input signal simultaneously on each of its inputs to have an output signal, or stated differently, to be enabled. This can only occur if "motor run" output channel 34 has an output word thereon simultaneously with a flip-flop 84 having a set output. Flip-flop 84 has a set voltage output when load push button 86 is closed so that a pulse is applied to the set input of flip-flop 84. Thus it is seen that the load push button 86 must be closed and the computer must be ready as evidenced by having an output motor run word 34 before the motor 12 can start.

This far I have only discussed requirements and means for starting motor 12 which drives the drum and the time sign information disk 62 and initiate cam 76. At this point, the beam of cathode ray tube 18 is still blanked. This beam stays blanked until certain conditions are met. These conditions require:

(1) An output on plot trace on output channel 45 of the computer;
(2) An initiate plot signal from photocell 82;
(3) The oscilloscope or cathode ray tube 18 to be in position;
(4) The motor to be running at full speed; and
(5) The manual load push button to be closed.

Output signal for all five of these criteria are required to enable "and" gate 88 and from the last three are required to enable "and" gate 90.

As will be seen, the output of "and" gate 88 is used to set unblanking flip-flop 100 whose output unblanks the cathode ray tube 18. Further "and" gate 88 must be enabled before flip-flop 100 can have an output which is also part of the requirement for providing an "interrupt" pulse and an "initiate" pulse to the computer. Other requirements for the "interrupt" and the "initiate pulse" will be discussed later.

Attention will now be directed briefly toward how "and" gate 88 is enabled. "And" gate 88 has five input taps all of which must have an input to have an ouput. The first input is connected to photocell 82 which has a pulse when aperture 78 of disc 76 is aligned between light source 80 and cell 82. Disk 76 is supported on shaft 61 the same as disk 62 but spaced therefrom. Photocell 82 provides the "initiate plot" pulse. The second input to "and" gate 88 represents the "plot trace" command of the computer and is provided with flip flop 94 is "set" by a signal from computer output channel 45. The third input to "and" gate 88 is provided on line 150 from digital comparator 35. As will be seen when FIGURE 4 is described, there is an output signal on line 150 when the position of oscilloscope 18 agrees with the scope position data from lead 48 of the computer. This indicates that the scope is in the proper position laterally along shaft 20.

The next input to "and" gate 88 represents the motor running requirement. This signal is provided when the motor is running at the proper speed. It is obtained after drive motor control 13 has been energized. The output on drive motor control 13 on line 96 is passed through a delay 98 which has a delay equal to the time required for motor 12 to obtain maximum speed. Thus by the time the signal passes through delay 98 and reaches "and" gate 88 and also the third input to "and" gate 90, which will be discussed later, motor 12 has attained the required speed. As can be seen, the output from load flip flop 84 signals the computer at computer input channel 50 that the load button has been pushed. It is also seen that the output of flip flop 84 is fed to "and" gate 43 which must have a second input to be enabled. The second input is a "motor run" signal from computer output terminal 34. When "and" gate 43 is enabled it opens switch 13 so that electrical energy from source 17 (when switch 15 is closed) flows both to delay 98 and to motor 12. The fifth input to "and" gate 88 is the load requirement which indicates that the load button 86 has been pushed indicating that the operator desires that printing begin. This load requirement on load pulse is obtained by flip flop 84 which is manualy set to have an output by pushing load push button 86. I have just discused the requirements for "and" gate 88 to have an output which causes unblanking flip flop 100 to have an output which unblanks the oscilloscope. As will be seen the output from "and" gate 88 can also cause an "interrupt" pulse to be fed to channel 58 of the computer.

Attention will now be directed toward "and" gate 90 and how it is enabled. The purpose of the output of "and" gate 90 is to inform the computer at input channel 52 that the printing mechanism is in the "ready status." In the embodiment before "and" gate 90 can have an output, the recording system must meet pre-requirements namely, the scope must be in position, the motor running at full speed, and the load button pushed. The "scope in position" line 150 is connected from scope position comparator 35 to the first input of "and" gate 90. The "scope in position" line 150 has an output when encoder 25 agrees with the information from the "scope position" word from output channel 48 of the computer. These two values are compared by digital comparator 35 and when in the required position, digital comparator 35 has an outpt "scope in position" constant level voltage output which is fed via conductor 150 to "and" gate 90 as well as to "and" gate 88 which was previously described. The motor running requirement is obtained after drive motor control 13 has been energized. The next input on "and" gate 90 is the "load" requirement. The load requirement for this input is obtained the same as the load requirement for the fifth input to "and" gate 88; namely, from flip flop 84 which is set to have an output by manually pushing load push button 86. As stated before, the output on drive motor control 13 on line 96 is passed through delay 98 which has a delay equal to the time required for motor 12 to obtain maximum speed. When these three requirements are met simultaneously "and" gate 90 has an output. This output advises the computer on channel 52 that the printing mechanism is in the "ready status."

Until the mechanism is ready to record, the electron beam of oscilloscope 18 is blanked. That is, it requires a voltage in excess of that from the seismic signal to unblank it. The purpose of this of course is that I do not want to expose film 16 until a seismic signal is ready to be recorded. Unblanking is obtained when "and" gate 88 has an output. "And" gate 88 has an output when the five requirements listed above are met. Unblanking is accomplished by connecting the output of "and" gate 88 to the "set" input of unblanking flip-flop 100. This flip-flop, when set by an output from "and" gate 88, has a voltage output. Flip-flop 100 has two reset inputs, and voltage level on either reset input resets the flip flop so that it has no output. The connections to these two reset inputs of flip-flop 100 will be discussed later.

When flip-flop 100 has an output it is fed to adder 102. The output of adder 102 is connected to an intensity driver 104 whose output in turn is connected to control the intensity of the electron beam of cathode ray tube 18. The level of the voltage output of flip-flop 100 is sufficient to raise the voltage such that the intensity of the beam is a function of the seismic signal. Without the unblanking voltage, the voltage of the seismic signal is not sufficient to energize the electron beam. The cathode ray tube is "blanked" by resetting "unblanking" flip-flop 100. This is accomplished by having a reset pulse applied to flip-flop 100 either by pushing reset button 41 connected to a reset voltage, or by a reset command from computer output terminal 44.

When the recording means is approaching its ready to record state, an "interrupt" pulse is provided to the computer on input channel 58. One way this occurs is when flip-flop 100 is set simultaneously with the occurrence of a "data" pulse from photoelectric cell 72. Both the "set" output and the "data" pulse are fed to "and" gate 106. The output of "and" gate 106 sets data flip-flop 108 so that it has a voltage output. Flip-flop 108 is similar to flip-flop 100 in that it too has two reset inputs, a pulse on either resets the flip-flop so that it has no output.

When the reproduction means is nearly ready to receive data, an "interrupt" pulse is provided on input 58 of the computer to alert it. The interrupt pulse can come from one of two sources. Either when the flip-flop 108 has output or when flip-flop 84 has an output. The output of flip-flop 108 is connected through a multivibrator 110 to "or" gate 112 which has two inputs. "Or" gate 112 passes either input whether the other input has a signal or not. The output of load flip-flop 84 is connected through a multivibrator 114 to the other input of "or" gate 112. Multivibrators 110 and 114 are such that when triggered provide an output pulse of proper magnitude to signal the computer. Thus when either flip-flop 84 or flip-flop 108 has a set output, an interrupt pulse is fed from either multivibrator 110 or 114 to terminal 58 of the computer.

The output of data flip-flop 108 is also connected to terminal 56 of the computer to advise the computer that it is "ready" for data. Additionally, the output of flip-flop 108 is connected to one input of "and" gate 116 which has two inputs required for an output. The other input to "and" gate 116 is connected to the output of photoelectric cell 66 which provides the "clock pulse" when each of slots 64 is properly aligned. The output of "and" gate 116 is connected to sample rate control means 118 and to time line means 134. What this has done is to synchronize the incremental revolution of film 16 with the sampling rate control word provided on output channel 46. The output of sample rate control means 118 is connected to channel 60 and each pulse of such sample rate control tells the computer to put another word on the data line. Details of sample rate control 118 is shown in FIGURE 3 and will be discussed hereinafter.

In operation it can be seen that there are real time saving means provided for advancing the spot exposing the film. The computer controls the position of the electron beam on the face of cathode ray tube 18. This information is obtained on channel 32 of the computer. The output on channel 32 is in digital form. Therefore the output of channel 32 is passed through digital to analog converter 32A before it is connected to horizontal drive 31. The position of cathode ray tube 18 along shaft 20 is also controlled by the computer and is obtained from channel 48. In ordinary operation the cathode ray tube 18 stays in one position on shaft 20 for a selected number of signals. The different signals are displayed on film 16 by moving the spot position laterally across the face of the cathode ray tube by steps for each trace as commanded by the computer. This minimizes lost time as the electron beam can be moved from one step position to the next nearly instantaneously so that there is no delay between printing of one trace following another trace. After the electron beam has advanced across the face of the cathode ray tube the computer gives a command on channel 48 to change the position of oscilloscope 18.

The comparator 35 compares the position of the step motor 23 with this command from the computer. If this is a new command it moves the motor until the motor position as indicated by encoder 25 is in agreement with the command from the computer. If the scope is not in position no printing occurs as the electron beam is blanked. This blanking occurs because line 150 connecting digital comparator 35 to "and" gate 88 has no output signal when encoder 25 is not in agreement with the command of the computer. This also disenables "and" gate 90 so that in addition to blanking the electron beam it also tells the computer not to pass a seismic signal on to be recorded. However as soon as digital comparator 35 finds that encoder 25 is in agreement with the command of the computer there is an output on line 150 which then enables "and" gates 88 and 90 so that they each have an output thus unblanking the cathode ray tube and telling the computer that the recording means is ready to receive another seismic signal. This is, of course, assuming that the other conditions for enabling these gates are still met.

It is seen that I have shown means for recording a signal from an oscilloscope and that means have been provided to alert the computer when the recording means is ready to start recording. Attention will now be directed to means for feeding the seismic signal to the oscilloscope. The seismic signals are provided at channel 30 of the computer. The seismic signal appearing at channel 30 of the computer is normally in digital form. Therefore a digital to analog converter 30A is provided. Means are provided so that the seismic signal can be recorded in either variable density or conventional form. Means are provided to maintain each seismic signal in a selected channel on the recording film. By variable density it is means that the trace or channel varies in intensity along its length in accordance with the strength of the seismic signal. By conventional recording it is meant that the amplitude of the signal varies according to the strength of the signal; this type trace is commonly referred to as a "wiggly" trace. The type signal to be displayed, that is, variable density or conventional, is determined by the command word appearing on output channel 38 of the computer. The word indicating the type display is connected to type display control 120. Display control 120 can for example be a solenoid switch which is actuated by a signal from the computer. Display control 120 is shown as being ganged connected to a first switch 122, a second switch 124 and a third switch 140. Switch 122 in a first position provides for a variable density display and in a second position provides for a conventional display. When switch 122 is in its No. 1 position, the seismic signal is connected to adder 102 which in turn is connected to intensity driver 104 which controls the intensity of the electron beam of cathode ray tube 18.

Means for conventional or "wiggly-trace" recording will now be discussed. When switch 122 is in its second position, the seismic signal is connected to means providing for such conventional recording. There the signal is connected to adder 126 which is connected to a D.C. horizontal driver 29. When in this position the electron beam is driven horizontally at an amplitude proportional to the strength of the seismic signal being displayed; thus a "wiggly-trace" recording is made.

Whether variable density or conventional seismic signal are recorded, for best results the width of the channel of the signal on the recording medium should be controlled. That is, each seismic trace should be for a certain width and occupy no more than that width on film 16. Further, in variable density recording, the width of a trace is frequently determined by the distance between the geophone location from which adjacent traces were obtained. Information as to the width of the channel for the trace is obtained from the computer at output terminal 40. The output of terminal 40 is connected to a width control means 128.

Figure 5:
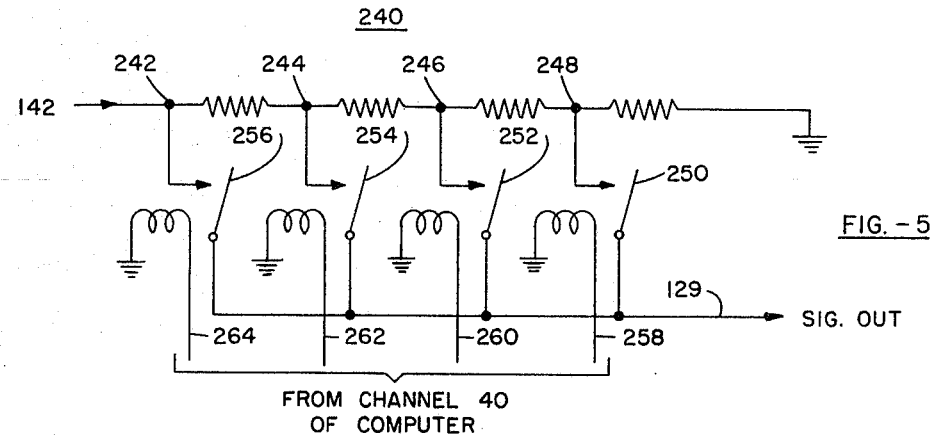
FIGURE 5 is a diagram of the width control means 128 of FIGURE 1.

A suitable width control means 128 is illustrated in FIGURE 5. Shown thereon is a conduit 142 which carries a sawtooth signal from time line generator 134 which will be discussed in relation to FIGURE 2. Conduit 142 is connected to voltage divider 240 which has a series of taps 242, 244, 246 and 248. Each of these taps are connected respectively to input taps of relay control switches 250, 252, 254, and 256. The output of these taps are connected to a signal output line 129 which goes to time line gate 144 and switch 140. The computer terminal 40 determines which of these relays are energized. As illustrated the line from terminal 40 of the computer is in fact a plurality of lines 258, 260, 262 and 264 which are connected respectively to the coils of switches 256, 254, 252 and 250.

Figure 2:
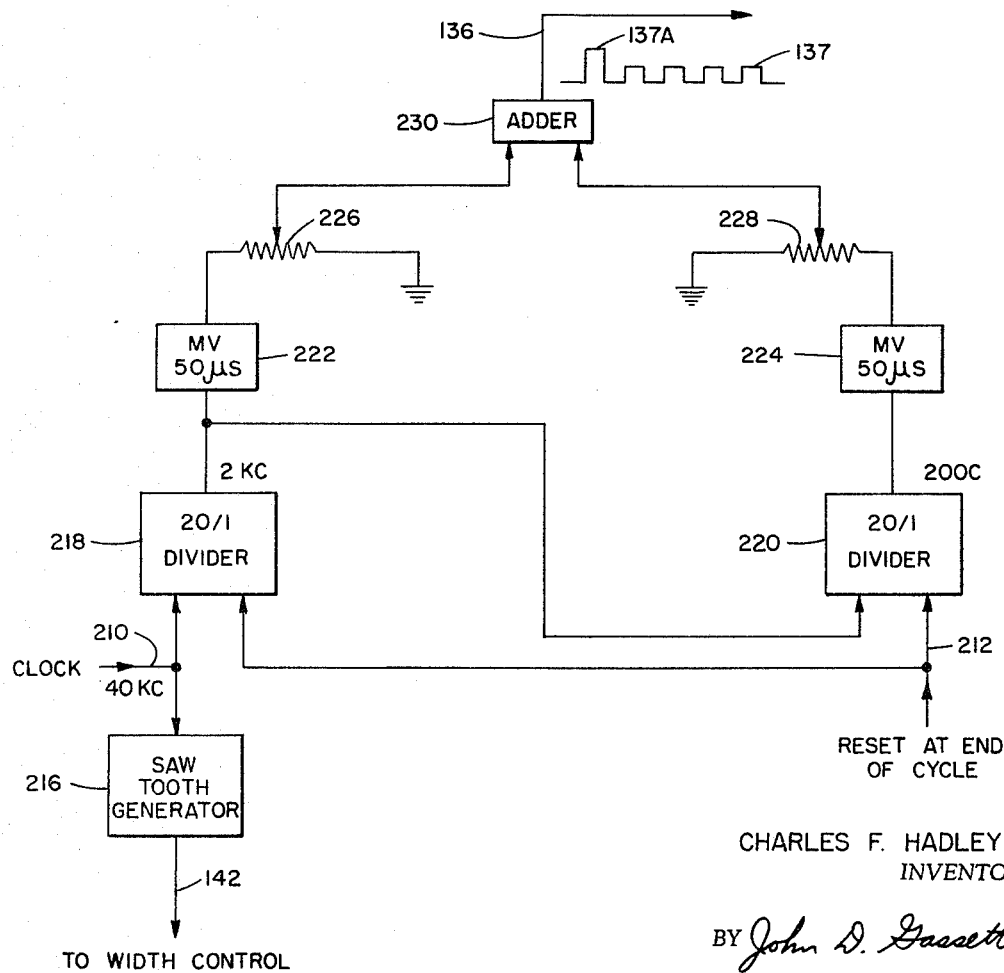
FIGURE 2 illustrates a time line generator as illustrated in FIGURE 1.

As will be seen when considering FIGURE 2 the input on line 142 to width control 128 is a plurality of sawtooth signals. The strength or amplitude of these signals determines the width of the variable density seismic signal as printed. By use of the device in FIGURE 5 the width is controlled, within limits, by output terminal 40 of the computer. In "wiggly trace" recording, the width of the channel is not set, but rather the signal is a single line which varies in amplitude as a function of the amplitude of the seismic signal. The width control 128 functions for variable density recording and determines width of time lines in conventional recording.

Nearly all seismic sections contain time lines to aid in determining the depth at which certain events appear on the section. These time lines are usually merely heavy marks across the individual traces. In the embodiment shown in the drawings the time line control information word is obtained at computer output terminal 42 which is connected to time line generator 134. There is one means for providing time lines for variable density type display and another one for conventional or wiggly trace display. A block diagram of a suitable time line generator is shown in FIGURE 2 and will be discussed later. When the device is told to print variable density type display, time line generator 134 has a first output connected through time line 136 to adder 102. This output is a time spaced time pulse which occurs when it is desired to have a time line recorded. The time pulse darkens the intensity of the electron spot as controlled by driver 104. The output on line 129 from width control 128 goes through switch 140 in its one position, to adder 126 to horizontal driver 29. The output on line 129, as will be seen, is a sawtooth signal which is used to repeatedly sweep the electron beam across the channel of the record. When a time pulse appears on line 136 it brightens the beam for one sweep and causes a time line to appear on film 16.

When the printer is set to print wiggly traces, switches 122, 124 and 140 are in their number 2 position as they are ganged. The seismic signal itself goes through switch 122 to its number 2 terminal, through electron switch 143 (which as will be seen is closed except when there is a time pulse on line 136) and on to adder 126. As I have said before, the output of adder 126 is connected to horizontal driver 29 and thus the electron beam has lateral movement according to the amplitude of the seismic signals. Intensity control 102 is set to provide the proper intensity for the electron beam of the cathode ray tube. To obtain the time line, switch 124 is in its No. 2 position and the output from time line generator 134 on line 136 is connected to time line gate 144. As will be seen in discussing time line generator 134, the output on line 136 is a series of equispaced, equi-width pulses with one pulse of greater magnitude which repeats after a selected number of pulses. This pulse of greater magnitude is commonly referred to as the "time line pulse." This "pulse" is also connected by line 136A to electronic switch 144 and through inverter 143A to electronic switch 143. The switches 143 and 144 are selected in relation to the time pulse on line 136 such that when there is such a time pulse, switch 144 is open and switch 143 is closed and conversely in the absence of a time pulse, switch 143 is closed and switch 144 open. To briefly summarize then, it is seen that in wiggly trace recording, a time pulse on line 136 and 136A from time line control 134 closes switch 144 and causes the electron beam to sweep across the entire width of the trace forming a time line; whereas without the time line pulse the horizontal driver causes the electron beam merely to follow the amplitude of the seismic signal. At the same time that the time pulse occurs, electron switch 143 is open and the seismic signal is not conducted to horizontal driver 29 during the duration of the time pulse. The output on line 136 from time line generator 134 is also fed to adder 102 the same as for variable density display. This increases the intensity of the electron beam of the cathode ray tube 18. Thus means are provided to place a time line upon film 16 at the command of the computer on either variable density or wiggly trace type display.

Attention is now directed toward FIGURE 2 which shows in block diagram a suitable time line generator 134 referred to in FIGURE 1. The input and output lines to time line generator 134 shown in FIGURE 1 are also shown in FIGURE 2. These include input line 210 which carries the plot pulse (40 kc.), input line 212 for the pulse reset at "end of cycle," output line 136 for the time pulse and output line 142 which goes to width control 128.

The input line 210 which has the plot pulses thereon is connected to sawtooth generator 216 and to a first divider 218. Each pulse on line 210 initiates the sawtooth generator 216. The sawtooth output output is fed on line 142 to width control 128 so that the 40 kc. oscillation is supplied.

A second divider 220 is also provided. These two dividers can be merely a series of flip flops which count down and let every 20th or 10th signal through. For example in one embodiment divider 218 permits every twentieth cycle therethrough. Thus the output frequency is 2 kc. The output of divider 218 is fed to a first multivibrator 222 and also to a second divider 220. The second divider in this particular example divided the input frequency by 10 and has a 200-cycle per second output which is connected to a second multivibrator 224. The input for each of the multivibrators determines when it will be fired. The width of each output pulse of the multivibrator is preset and is preferably of the same width, e.g., 50 microseconds. The output of multivibrators 222 is connected through a variable resistance 226 to give a selected voltage to the output from the multivibrators. Likewise multivibrator 224 is connected through a variable resistor 228 so that it can have a controlled voltage level on its output. The output from resistors 226 and 228 are connected to adder 230 whose output is on line 136. The output on line 136 is a plurality of equispaced pulses 137 with pulses 137A having an amplitude much greater than the other pulses. The amplitude 137A is the result of the output of multivibrator 222 which is set by voltage resistor 226 to have a relatively high amplitude. The electron switches 144 and 143 of FIGURE 1 can be set if desired to open or close only by the large pulse 137A. It will be noted that multivibrator 222 fires or has an output frequency of 2 kc. The output pulses 137 of multivibrator 224 has, in this particular example, a 200 cycle per second output and thus fires multivibrators 224 whose output is set by voltage regulator 228 to have a reduced amplitude from its pulses 137A which result from multivibrator 222. On this record the time lines have equivalent times of 10 ms. and 100 ms., for example.

Attention is next directed toward FIGURE 3 which shows a block diagram of a sample rate control means which is illustrated in FIGURE 1 and referred to as reference numeral 118. The clock input is designated as line 116A and obtains its pulses from photoelectric cell 66 which emits pulses proportional to the rate of rotation of recording drum. In one particular embodiment this clock rate is 40 kc. per second. The sample rate control is connected to lead lines 46A and 46B. These lines are connected to output terminal 46 of the computer which provides two sample rate control words. These can be bits 18 and 19. With the device of FIGURE 3, four different frequencies can be obtained on the output 60 which is the synchronous pulse. If the clock has a 40 kc. output, then with this embodiment there can be four different sampling control rates obtained. These are shown from the following table.

*Table III*

| Code: | | Frequency, kc. |
|---|---|---|
| $\overline{18}$ | $\overline{19}$ | 5 |
| $\overline{18}$ | 19 | 10 |
| 18 | $\overline{19}$ | 20 |
| 18 | 19 | 40 |

There are four "and" gates 160, 162, 164 and 166, each having three inputs required for an output. If the clock on 116A is set for 40 kc., then means are provided so that on lines 168, 170, 172 and 174 the inputs of these "and" gates are provided respectively with pulses at the rate of 40 kc., 20 kc., 10 kc., and 5 kc. The proper frequency is obtained on line 168 by feeding the output of the clock from line 116A directly to line 168 to obtain the 40 kc. The output of the clock is also fed to a flip-flop 176 whose output is a pulse rate one-half that of the input, assuming a steady rate of clock pulse inputs. Thus the output on line 170 from flip-flop 176 will be half that on line 168; in this example, 20 kc. The output of flip-flop 176 is fed to the set input of flip flop 178 whose output appears on line 172 and is one-half the pulse rate of the output of flip-flop 176. This obtains the 10 kc. Likewise the output of flip-flop 178 is connected to the set input of flip-flop 180 whose output appears on line 174 and whose rate is one-half that of the output of flip-flop 172. Thus we have 40 kc., 20 kc., 10 kc. and 5 kc., fed to one of the inputs respectively of gates 160, 162, 164 and 166. Which of these "and" gates is enabled is determined by Boolean algebra as shown in the code above. The bit "18" is fed to an inverter 182 whose output is then fed to one of the inputs of flip-flops 162, 164 and 166. The signal representing 18 in its uninverted state is fed to one of the inputs of "and" gate 160. The bit representing the "19" on line 46B is fed to inverter 184 and also to one of the inputs of "and" gates 160, 162 and 164. The inverted output from inverter 184 is fed to the input of "and" gate 166. Thus the code of the words 18 and 19 determines which "and" gate is enabled and thus which sampling frequency is used. The output of the "and" gates 160, 162, 164 and 166 are each fed through "or" gate 186 whose output is connected to line 60.

Attention is now directed to FIGURE 4 for a block diagram of a suitable digital comparator identified by reference numeral 35 in FIGURE 1. Shown in FIGURE 4 is a 2's complement subtractor 194. Such 2's complement subtractor is well known; for example, see Arithmetic Operations in Digital Computers, by R. K. Richards, D. Von Nostrand Co., pages 113–119. Subtractor 194 receives digital data from output terminal 40 on channels 190. Channels 190 is shown as having four individual channels with the first one being the sign; however, any number of channels can be used. Channels 192 receives an equal number of channelized information from encoder 25 with the first channel being a sign channel. The difference between the input and output to subtractor 194 appears on channels 196 of which there are the same number as there are on channels 190 and 192. The first channel 198 determines the sign, or direction, which step motor 23 is to be driven. This is connected to step motor driver 27.

An inverter 200 is provided for each of the individual channels 196. The outputs of these inverters 200 are connected to an "and" gate 202 which requires an input from each inverter 200 to have an output. The output of "and" gate 202 is connected (1) to provide a "scope in position" signal on line 150 and also (2) to inverter 204. The output of inverter 204 is connected to step motor driver 27.

In operation, the device of FIGURE 4 compares the digital data from the computer which shows a required position with the actual position for encoder 25. This is performed by 2's complement subtractor 194. If the digital data from the computer agrees with the digital data from the encoder 25, the 2's complement subtractor 194 has no output. Under this condition the outputs on channel 196 are all 0's and when inverted, causes "and" gate 202 to have an output and indicates on line 150 that oscilloscope 18 is in position. This pulse is inverted by inverter 204 and is fed to step motor driver 27 which is of a character to not drive the motor when such a signal is received as it indicates that the oscilloscope is in the proper position.

If the 2's complement subtractor has an output other than zero, it indicates that the oscilloscope is not in the position commanded by the computer. This results in "and" gate 202 not having an output. By the "and" gates having an output it is meant that they have an output pulse or signal at one level which distinguishes it from a signal it may have thereon when it is not enabled. The output from "and" gate 202 is inverted by inverter 204 which tells the driver 27 to drive the motor. The direction which the motor is to be driven is furnished from channel 198, the sign of the difference of the binary numbers fed on channel 190 and 192 to the 2's complement subtractor 194.

While the above embodiment of the invention has been made with a certain amount of detail, it is to be remembered that various modifications can be made therein without departing from the scope of my invention.

I claim:

1. A display means for use with a computer which has a plurality of output and input channels including an information signal output channel, an oscilloscope position channel, and an oscilloscope spot position channel which comprises:
   a recording drum for supporting a recording medium thereon;
   drive means for rotating said drum;
   an oscilloscope means having an electron beam and including means for moving said oscilloscope laterally along a line parallel to the axis of said recording drum so that light from said electron beam is directed on to the recording medium of said drum;
   means to modulate the electron beam of said oscilloscope means according to a signal from said information signal channel;
   means for directing the position of said electron beam on the face of said oscilloscope means in accordance with the output of said oscilloscope spot position terminal;
   a comparator means for comparing the lateral position of said oscilloscope with the information on said oscilloscope position channel;
   drive means controlled by said comparator means for positioning said oscilloscope.

2. A display means as described in claim 1 including means for blanking the electron beam of said oscilloscope when said oscilloscope is not in a position commanded by the output on said oscilloscope position channel of said computer.

3. A display means as defined in claim 1 including means for blanking said electron beam of said oscilloscope until said drive means is running full speed.

4. A display means as described in claim 2 in which the computer has an input channel for receiving "plot" pulses, said display means including timing means to provide "plot" pulses for each selected portion of rotation of said drum.

5. A display means as defined by claim 4 in which said timing means includes a disk having spaced radial slots and supported on the axis of said recording drum and including a light source on one side of said disk and a photoelectric cell on the other side.

6. A display means as described in claim 5 in which means for generating a "start of data" pulse is provided and which includes a radial slit on a second disk mounted on the axis of said recording drum, a light source on one side of said second disk and a photoelectric cell on the other side and arranged so that when said start of "start of data" pulse slot is aligned therewith that a start of "data" pulse is emitted.

7. A display means as defined in claim 1 including a time line generator for periodically placing a time line mark upon said recording medium.

8. A display means as defined in claim 6 and in which the computer has a "plot trace" channel and wherein said means for blanking the electron beam of said oscilloscope includes:

manual means for initiating a load pulse;
an electrical supply source for driving said drive means;
delay means;
means to connect said delay means to said voltage source simultaneously with the connection of said voltage source to said drive means;
adder means whose output is connected to control the intensity of the electron beam;
a flip-flop whose output is connected to said adder means;
an "and" gate whose output is connected to the set input of said flip-flop, said "and" gate having five inputs, said first input connected to the photoelectric cell adjacent said second disk, said second input connected to the plot trace channel of said computer, said third input connected to said comparator means which has an output when the lateral position of the oscilloscope conforms with the information on the oscilloscope position channel, said fourth input being connected to said delay means and said fifth input being connected to said manual means for initiating a load pulse.

9. A display means as defined in claim 1 including means to oscillate at a constant frequency said electron beam laterally to the movement of the surface of said drum and within a preselected width, and a time line generator whose output is connected to control the intensity of said electron beam, said time line generator including (a) clock pulse generating means for generating clock pulses in accordance with incremental rotations of said recording drum, (b) a first multivibrator, (c) a second multivibrator, (d) a first pulse divider, (e) a second pulse divider, (f) means connecting said pulse generating means to said first pulse divider, (g) means connecting the output of said first pulse divider to said first multivibrator and to said second divider, (h) means connecting the output of said second pulse divider to said second multivibrator, such that said first and said second multivibrator are actuated at different frequencies, such different frequencies being at constant frequency of the frequencies of said clock pulses from said clock pulse generating means, (i) first voltage control means connected to the output of said first multivibrator, (j) second voltage control means connected to the output of said second multivibrator, (k) adding means connected to the outputs from said first and said second voltage control means, (l) and means connecting the output of said adding means to the intensity control means of said oscilloscope means.

10. A display means as defined in claim 9 including first connecting means for electrically connecting the information signal output channel to the horizontal control means of said oscilloscope means;

second connecting means for electrically connecting said adding means for adding the pulses from said first and said second multivibrators to the horizontal control means of said oscilloscope means;
a first switch in said first connecting means;
a second switch in said second connecting means;
control means for closing said first switch and opening said second switch when the added output of said first and second multivibrators is below a given voltage level and to open said first switch and close said second switch when the added output is above such voltage level.

References Cited

UNITED STATES PATENTS 3,158,433    11/1964    Alexander et al. _ _ _ _ _ _ 346—110

RICHARD B. WILKINSON, *Primary Examiner.*

MICHAEL LORCH, *Assistant Examiner.*